United States Patent
Chuang et al.

(10) Patent No.: US 9,697,195 B2
(45) Date of Patent: Jul. 4, 2017

(54) CONSTRUCTION OF A LEXICON FOR A SELECTED CONTEXT

(71) Applicant: Microsoft Technology Licensing, LLC, Redmond, WA (US)

(72) Inventors: Darren Chuang, New Taipei (CN); Jingmei Li, Beijing (CN); Zhen Liu, Tarrytown, NY (US); Mak Chiu Chun Bobby, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/716,244

(22) Filed: May 19, 2015

(65) Prior Publication Data

US 2016/0110341 A1 Apr. 21, 2016

Related U.S. Application Data

(63) Continuation of application No. PCT/CN2014/088619, filed on Oct. 15, 2014.

(51) Int. Cl.
*G06F 17/27* (2006.01)
*G06F 5/01* (2006.01)
*G06F 17/22* (2006.01)

(52) U.S. Cl.
CPC ........... *G06F 17/277* (2013.01); *G06F 5/01* (2013.01); *G06F 17/2223* (2013.01); *G06F 17/2735* (2013.01)

(58) Field of Classification Search
CPC .................................................... G06F 17/27
See application file for complete search history.

(56) References Cited

U.S. PATENT DOCUMENTS

| | | | | |
|---|---|---|---|---|
| 5,535,120 A | * | 7/1996 | Chong | G06F 17/2264 704/3 |
| 5,619,410 A | * | 4/1997 | Emori | G06F 17/2795 704/7 |
| 5,867,811 A | * | 2/1999 | O'Donoghue | G06F 17/2827 704/1 |

(Continued)

FOREIGN PATENT DOCUMENTS

| | | |
|---|---|---|
| CN | 1924858 A | 3/2007 |
| WO | 2014031505 A1 | 2/2014 |

OTHER PUBLICATIONS

"International Search Report & Written Opinion Received for PCT Application No. PCT/CN2014/088619", Mailed Date: Jul. 17, 2015, 11 Pages.

(Continued)

Primary Examiner — Douglas Godbold
(74) Attorney, Agent, or Firm — Cooper Legal Group

(57) ABSTRACT

Various technologies pertaining to constructing a lexicon for a defined context are set forth herein. Social media text is acquired, where the social media text has contextual data that corresponds thereto. The social media text is encoded to form encoded text (in Unicode), and the contextual data is assigned to the encoded text. A text corpus for a defined context is formed by filtering the encoded text based upon contextual data, such as location. Frequency of occurrence of words or phrases in the text corpus is used to identify words or phrases that are to be included in the lexicon.

20 Claims, 9 Drawing Sheets

(56) References Cited

U.S. PATENT DOCUMENTS

| | | | |
|---|---|---|---|
| 5,907,821 A * | 5/1999 | Kaji | G06F 17/2715 704/10 |
| 7,933,960 B2 | 4/2011 | Chen et al. | |
| 8,554,854 B2 | 10/2013 | Benyamin et al. | |
| 2003/0139920 A1* | 7/2003 | Abir | G06F 17/2775 704/2 |
| 2003/0204400 A1 | 10/2003 | Marcu et al. | |
| 2005/0033565 A1 | 2/2005 | Koehn | |
| 2005/0198026 A1* | 9/2005 | Dehlinger | G06F 17/2881 |
| 2006/0009963 A1* | 1/2006 | Gaussier | G06F 17/2735 704/7 |
| 2006/0235881 A1* | 10/2006 | Masarie | G06F 17/278 |
| 2007/0203688 A1* | 8/2007 | Fuji | G06F 17/28 704/2 |
| 2008/0040098 A1* | 2/2008 | Suzuki | G06F 17/2872 704/4 |
| 2008/0103757 A1* | 5/2008 | Washizawa | G06F 17/28 704/2 |
| 2008/0221866 A1* | 9/2008 | Katragadda | G06F 17/2223 704/8 |
| 2008/0221890 A1 | 9/2008 | Kurata et al. | |
| 2009/0077130 A1 | 3/2009 | Abernethy et al. | |
| 2009/0182547 A1* | 7/2009 | Niu | G06F 17/2827 704/2 |
| 2010/0114887 A1 | 5/2010 | Conway et al. | |
| 2010/0324886 A1* | 12/2010 | Tanaka | G06F 17/2827 704/7 |
| 2011/0137636 A1* | 6/2011 | Srihari | G06F 17/2863 704/2 |
| 2011/0202330 A1* | 8/2011 | Dai | G06F 17/2755 704/2 |
| 2011/0246486 A1* | 10/2011 | Peng | G06F 17/2775 707/750 |
| 2011/0288852 A1* | 11/2011 | Dymetman | G06F 17/2827 704/4 |
| 2011/0301935 A1* | 12/2011 | Quirk | G06F 17/2827 704/2 |
| 2011/0302006 A1* | 12/2011 | Avner | G06F 17/2785 705/14.4 |
| 2012/0016821 A1* | 1/2012 | Kobayashi | G06F 17/277 706/12 |
| 2012/0047172 A1* | 2/2012 | Ponte | G06F 17/3061 |
| 2012/0054220 A1* | 3/2012 | Zhang | G06F 17/30737 707/769 |
| 2012/0101804 A1* | 4/2012 | Roth | G06F 17/2818 704/2 |
| 2013/0144600 A1* | 6/2013 | Jiang | G06F 17/28 704/3 |
| 2013/0151239 A1* | 6/2013 | Kobayashi | G06F 17/2795 704/9 |
| 2013/0159273 A1 | 6/2013 | Orr et al. | |
| 2014/0143665 A1 | 5/2014 | Hauser et al. | |
| 2014/0163958 A1* | 6/2014 | Chen | G06F 17/27 704/9 |
| 2014/0379329 A1* | 12/2014 | Dong | G06F 17/2775 704/9 |
| 2015/0019200 A1* | 1/2015 | Woodward | G06F 17/2836 704/2 |
| 2015/0120788 A1* | 4/2015 | Brun | G06F 17/30312 707/812 |
| 2015/0234807 A1* | 8/2015 | Phillips | G06F 17/275 704/9 |
| 2016/0055187 A1* | 2/2016 | Ishizawa | G06F 17/2795 704/9 |

OTHER PUBLICATIONS

Tang, et al., "Measuring the Influence of Social Networks on Information Diffusion on Blogspheres", In Proceedings of the Eighth International Conference on Machine Learning and Cybernetics, Baoding, Jul. 12, 2009, 7 pages.

* cited by examiner

CONSTRUCTION OF A LEXICON FOR A SELECTED CONTEXT

RELATED APPLICATION

This application is a continuation of International Application No. PCT/CN2014/088619, filed on Oct. 15, 2014 in the State Intellectual Property Office of the People's Republic of China, and entitled "CONSTRUCTION OF A LEXICON FOR A SELECTED CONTEXT". The entirety of this application is incorporated herein by reference.

BACKGROUND

New words, acronyms, phrases, etc. are continuously emerging in lexicons of respective languages (spoken and written). Introduction of words, acronyms, phrases, etc. into lexicons is particularly prevalent in social networking applications, where users of such applications collectively introduce and use words, acronyms, phrases, etc. previously not part of any lexicon. In an example, the acronym "TTYL" is not found in a conventional English dictionary. Users of social networking applications, text messaging applications, and the like, however, often use this acronym, which has the meaning "talk to you later" in the English language; accordingly, "TTYL" is in the lexicon of English social networking users. Newly introduced words, acronyms, phrases, etc. can evolve differently for different contexts (e.g., amongst users of certain age groups, amongst users from certain locations, amongst users who speak different languages, etc.). Due to the rapid evolution of lexicons, it is difficult to identify newly introduced words, acronyms, phrases, and the like into a lexicon.

SUMMARY

The following is a brief summary of subject matter that is described in greater detail herein. This summary is not intended to be limiting as to the scope of the claims.

A computing system described herein includes a processor; and memory that comprises a lexicon generator system that is executed by the processor. The lexicon generator system configured to generate a lexicon used in context text, the lexicon generator system configured to include at least one of a mixed language word or a mixed language phrase in the lexicon based upon frequency of occurrence of the mixed language word or the mixed language phrase in the context text.

DETAILED DESCRIPTION

Figure 1:
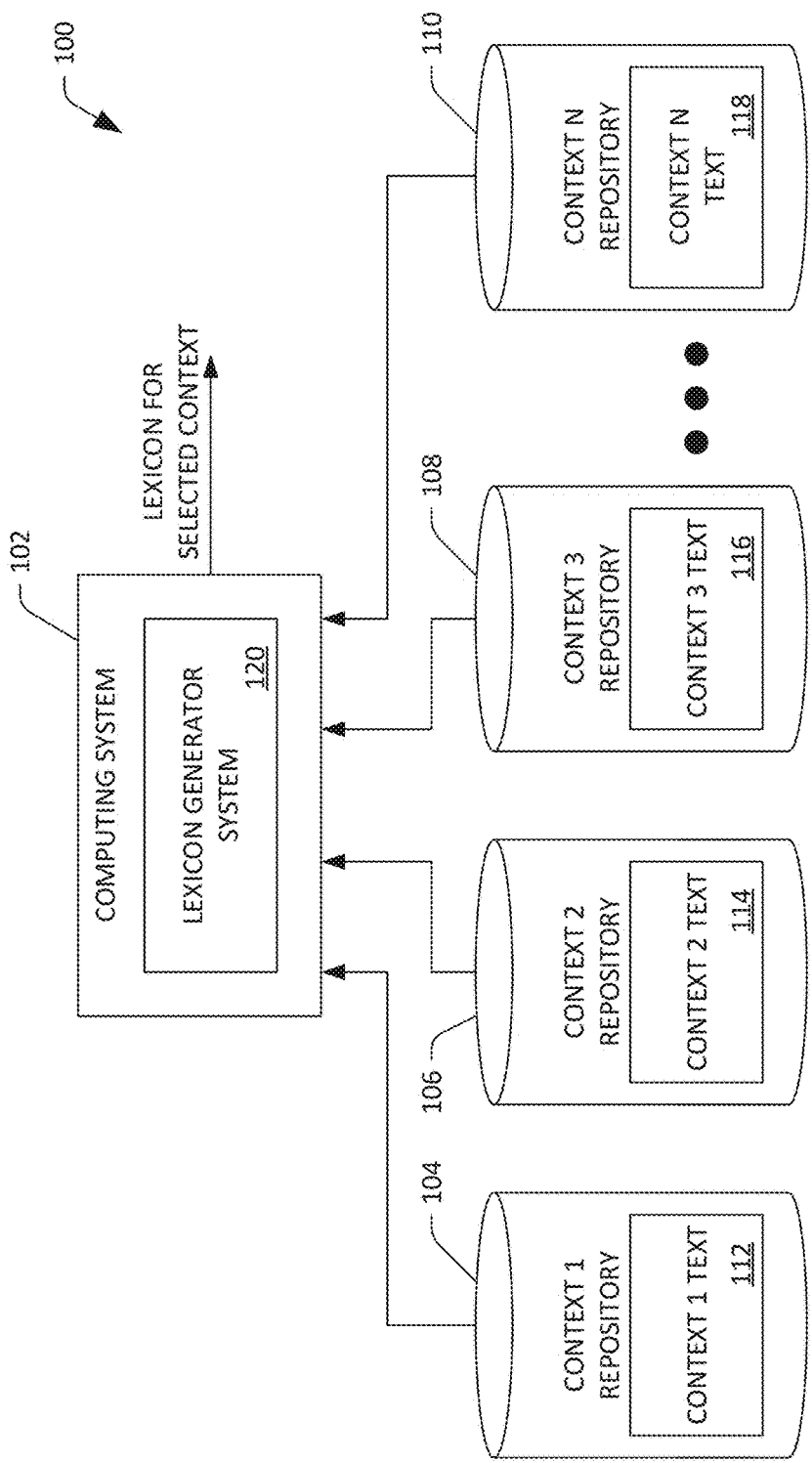
FIG. 1 is a functional block diagram of an exemplary system that facilitates constructing a lexicon based upon a text corpus of a defined context, the text corpus generated by way of at least one social networking application.

Various technologies pertaining to constructing a lexicon for a defined context are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that is configured to construct a lexicon for a defined context is illustrated. The system 100 includes a computing system 102, which can be a computing device or a plurality of computing devices operating in conjunction. The system 100 further includes a plurality of context repositories 104-110, wherein the context repositories 104-110 comprise respective context texts 112-118. Specifically, the first context repository 104 includes first context text 112, the second context repository 106 includes second context text 114, the third context repository 108 includes third context text 116, and the nth context repository includes nth context text 118. While the system 100 is illustrated as including a plurality of different context repositories that include respective context texts, as will be described below, the context texts 112-118 may be generated by querying over a text corpus with a context-based query (e.g., location, demographics, etc.), where entries therein have contextual data respectively assigned thereto. Therefore, the context texts 112-118 may be included in a single repository, and the architecture of the system 100 shown in FIG. 1 is set forth for purposes of illustration only. Pursuant to an example, the context texts 112-118 can include encoded text, wherein the encoded text conforms to a suitable encoding standard, such as Unicode. Accordingly, text in different languages can be represented using a common format.

With more detail pertaining to the context texts 112-118, such context texts 112-118 can include text exposed one or more social networking applications, where the text has been generated and/or shared by users of the social networking application(s). A social networking application is an application that is configured to allow users thereof to generate and share content, wherein the content can include text. For example, a social networking application may include an application that is suitable for generating web logs, a micro-blogging application (where a member can generate text and/or images and share the text and/or images to a public feed or to users that subscribe to posts generated by the member, and where the amount of information in each post is limited to a predefined number of characters), an application where members can post information on a personal page (sometimes referred to as a wall), and where others can post messages, etc.

Further, the context texts 112-118, can include text identified by those that generated the text (or optionally shared the text) as being accessible to the general public. Text that is identified as being publicly accessible can be acquired from at least one social networking application, and separated into individual entries. An entry may be an entirety of a post, journal entry, etc., or a portion of a post, journal entry, etc. (e.g., a sentence in a journal entry). As will be described below, contextual data can be assigned to each entry. Exemplary contextual data that can be assigned to an entry can include, but is not limited to: 1) geographic location associated with the entry (e.g., as defined in a publicly-accessible profile of a user that generated or shared the entry); 2) demographic information about the user that generated the entry (e.g., age, gender, ethnicity, etc.), wherein the demographic information can be acquired from the profile of user that generated or shared the entry; 3) time when the entry was generated or shared (e.g., from a timestamp assigned to the entry by the social networking application); 4) interests of the user that generated or shared the entry (e.g., as defined in the profile of the user); 5) a social networking application used to generate or share the entry, amongst other contextual data.

In an example, then, the first context text 112 can include entries that have a particular geographic location assigned thereto (e.g., country, state, city, geographic radius from a specified point, etc.), the second context text 114 can include entries that have a second geographic location assigned thereto, and so on. In another example, the third context text 116 can include entries that have been assigned contextual data that indicates that the entries were generated and/or shared by users in a first age range, while the nth context text 118 can include entries that have been assigned contextual data that indicates that the entries were generated and/or shared by users in a second age range. In a further example, context texts 112-118 can include data assigned combinations of contexts, such as geographic location, gender, and time. Accordingly, relatively granular context texts can be generated. Further, it is to be understood that the context texts 112-118 can be anonymized—accordingly, information that uniquely identifies users that generate and/or share entries may not be included in the contextual data of the context texts 112-118.

The computing system 102 also includes a lexicon generator system 120 that is configured to generate a lexicon for one or more of the context texts 112-118. For purposes of explanation, in an example, a user of the computing system 102 can indicate that the lexicon generator system 120 is to generate a lexicon for the first context text 112. As will be described in greater detail below, responsive to the lexicon generator system 120 receiving the above-mentioned indication, the lexicon generator system can be configured to perform at least one scan over the first context text 112, wherein the at least one scan results in formation of compound words, each compound word including a sequence of words. When multiple scans are performed, in each scan, each compound word has an equivalent number of words therein. A compound word, then, includes some number of consecutive (single) words. In another exemplary embodiment, a single scan can be performed to generate compound words of varying length, where multiple counters can be employed to form (and count) compound words in a single scan.

Thus, for instance, in a first scan, each compound word can include a single word; in a second scan, each compound word will include two sequential words; in a third scan, each compound word will include three sequential words, etc. As used herein, the term "word" is to include a continuous sequence of characters; therefore, herein an acronym is referred to as a word, a transliteration is referred to as a word, etc. The lexicon generator system 120 can identify compound words to include in the lexicon for the first context text 112 based upon frequency of occurrence of compound words in the first context text. For example, the more frequently a compound word is included in the first context text 112, the more likely that the compound word is included in a lexicon for the context of the first context text 112. The lexicon generator system 120 can output the lexicon for the context based upon frequency of occurrence of compound words in the first context text 112. While the description above indicates that multiple scans are performed to form the compound words and calculate statistics corresponding to such words, it is to be understood that formation of compound words and calculation of statistics can be undertaken in a single scan. For example, multiple counters can be simultaneously incremented when particular compound words are identified.

The approach described herein has various advantages over conventional manual approaches for identifying lexicons for contexts. For instance, the lexicon generator system 120 can be configured to identify a lexicon for a relatively granular context. For instance, a company may wish to understand the lexicon of a particular gender and age demographic in a particular location (e.g., what words and phrases are being used by males between the ages of 25 and 35 in the city of Beijing, China). Further, the lexicon generator system 120 can output lexicons relatively dynamically. For instance, the lexicon generator system 120 can be executed once a day over a sliding time window (e.g., the last three months) to identify words and phrases that are being used in a defined context.

Still further, the lexicon generator system 120 can be configured to include mixed language words and/or phrases, as well as transliterations, in a generated lexicon. For instance, in some geographic locations, it has become somewhat common for users of social networking applications to use mixed-language words and/or phrases. A mixed language word can include a first portion in a first language (e.g., Chinese) and a second portion in a second language (e.g., English). A mixed language phrase can include a first word in a first language and a second word in a second language. Encoding text into a universal format, as noted above, facilitates recognition of mixed-language words and/or phrases and transliterations for inclusion in the lexicon. Accordingly, the lexicon generator system 120 need not perform a semantic analysis over the context texts 112-118 in the context repositories 104-110 to identify mixed language words and/or phrases or transliterations.

In a non-limiting example, a mixed language word may include at least one logogram in a first language and at least one logogram in a second language. A logogram can be a symbol (character) that is used in Eastern Asian languages, such as Chinese, Japanese, and Korean. In another example, a mixed language word may include a logogram in a first language and an alphanumeric character in a second language. In still yet another example, a mixed language word can include at least one alphanumeric character that corresponds to a first language and at least one alphanumeric character that corresponds to a second language. A transliteration refers to conversion of text from a first script to a second script. For instance, a transliteration may occur, for example, when an English keyboard is used to generate Arabic text, as follows: "Keif 7luk a5ee. Men ayna je2ta", which translates to "How are you, bro? Where are you from?" in English.

The lexicon output by the lexicon generator system 120 for the selected context text (e.g., the first context text 112) can be used in a variety of applications. For example, words and/or phrases in the lexicon may used as auto-completions when query prefixes are provided to a search engine. In another example, the lexicon may be provided to companies that wish to present electronic communications to users who query words or phrases in the lexicon. In yet another example, words and/or phrases in the lexicon may be used by a word processing application for purposes of spell-checking. Other applications will be recognized.

Figure 2:
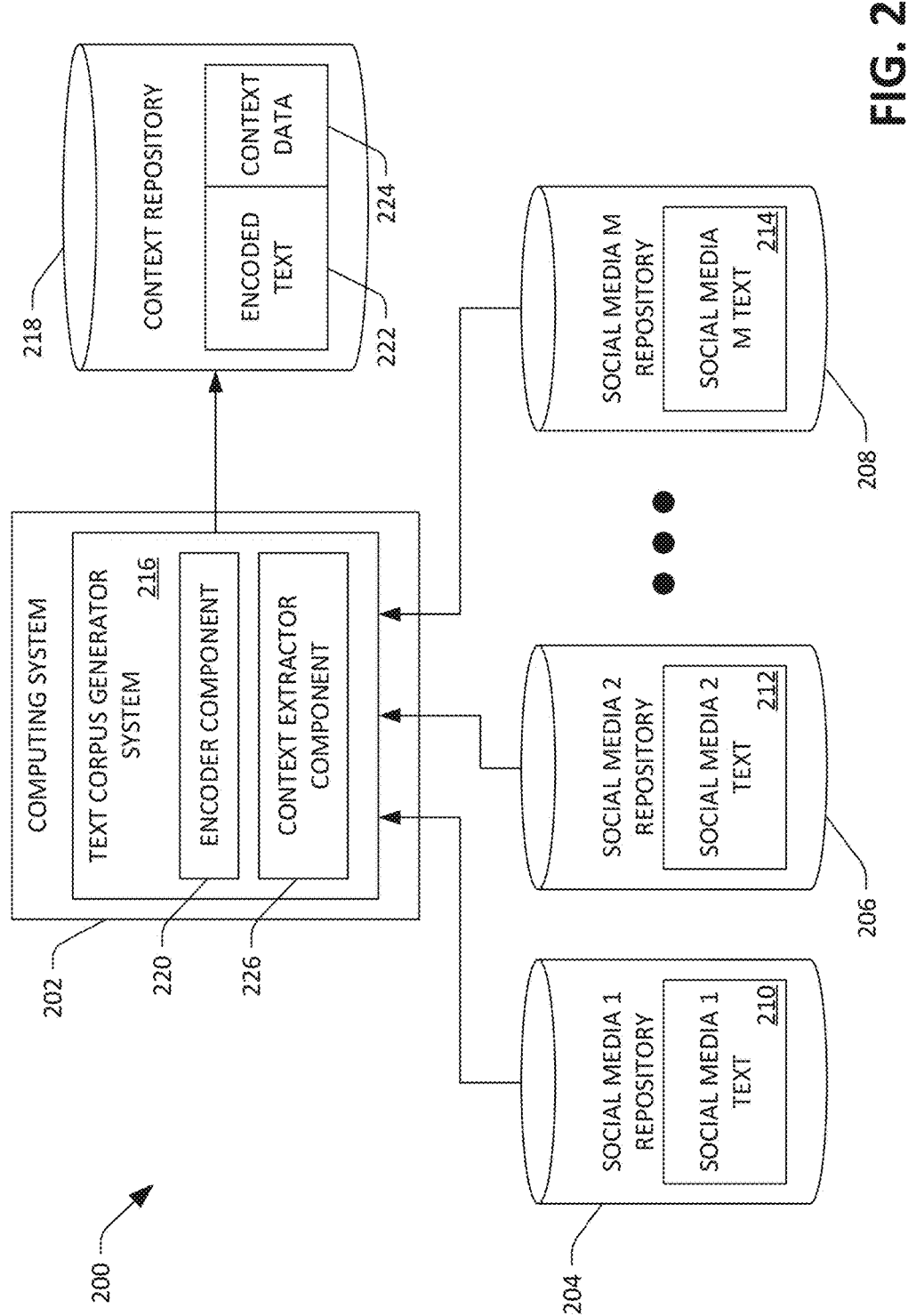
FIG. 2 is a functional block diagram of an exemplary system that facilitates constructing a text corpus that includes contextual data.

Turning now to FIG. 2, an exemplary system 200 that facilitates generation of context texts is illustrated. The system 200 includes a computing system 202 that is in network communication with a plurality of social media repositories 204-208, which can correspond to different social media applications. The social media repositories 204-208 can include respective social media texts 210-214, wherein, for example, the first social media text 210 includes text exposed by a first social networking application, the second social media text 212 includes text exposed by a second social networking application, etc. As described above, the social media texts 210-214 in the respective social media repositories 204-208 may be identified as being accessible to the public by the generators and/or sharers of such text. For example, the first social media text 210 may be included in public feeds of a first social networking application, the second social media text 212 may be blog text that is generally accessible by way of the World Wide Web, and so forth.

The social media repositories 204-208 may have application programming interfaces (APIs) corresponding thereto that are exposed, such that the social media texts 210-214 can be acquired. In another example, a computer-executable program (sometimes referred to as a "bot" or "spider") can extract the social media texts 210-214 from publicly-accessible pages of the social networking applications.

The computing system 202 can receive at least one social media text from the social media texts 210-214. In an example, the computing system 202 can receive the first social media text 210, which, as described above, includes text generated and/or shared by way of a first social networking application. The first social networking application may be a worldwide social networking application having members in several different countries who speak multiple different languages. The computing system 202 can be configured to assign contextual data to each entry in the first social media text 210, wherein the contextual data can identify location of a user who generated and/or shared the entry, demographics of the user who created and/or shared the entry, etc. As noted previously, this information may be available in publicly accessible profiles of users of the first social networking application.

The computing system 202 includes a text corpus generator system 216 that is configured to receive at least the first social media text 210 (and optionally other social media texts in the social media texts 210-212) from the social media repositories 204-208. The system 200 also includes a context repository 218 that is included in or is in communication with the computing system 200. The text corpus generator system 216 includes an encoder component 220 that is configured to encode social media text (e.g., the first social media text 210) to generate encoded text 222 and retain the text 222 in the context repository 218.

The encoded text 222, generated by the encoder component 220, can have a normalized format, such that text in different languages is represented in a consistent manner in the encoded text 222. In an example, the encoder component 220 can encode the social media texts 210-214 into Unicode. When encoding the texts, the encoder component 220 can identify individual entries therein. For instance, the encoder component 220 can identify certain punctuation marks, such as periods, commas, semicolons, exclamation points, etc., and can partition social media text into individual entries based upon such punctuation marks.

The text corpus generator system 216 can further include a context extractor component 226 that extracts contextual data from publicly-accessible profiles of users of the social networking applications who respectively generated and/or shared the entries and accordingly assigns such contextual data to entries. To preserve privacy, for example, the context extractor component 226 can cleanse the profile data of information that may uniquely identify users, including user identities, user contacts, etc. Therefore, the context extractor component 226 may refrain from extracting names of users of the social networking applications, precise locations of the users of the social networking applications (e.g., street address), and other information that may be deemed private. The context extractor component 226, however, can extract information and can assign context data 224 (such as the contextual data referenced above) to entries in the encoded text 222, wherein at least a portion of the context data 224 can be extracted from profiles of users that generated and/or shared social media text.

Thus, each post generated and/or shared by a user of a social networking application (with a publicly accessible profile) can be decomposed into one or more entries, encoded by the encoder component 220, and assigned contextual data by the context extractor component 226.

While the system 200 has been described as aggregating data across geographic locations and social networking applications to generate the encoded text 222 and associated context data 224, it is to be understood that different encoded text may be generated for different contexts and retained in separate repositories. For example, due to differences in language, it may be desirable to generate different encoded text for languages that use different characters. For instance, it may be desirable to separate languages that utilize alphanumeric characters (such as English) from languages that use logograms (such as Chinese). This separation may be useful, as different word breaking techniques can be used over such different types of languages.

Figure 3:
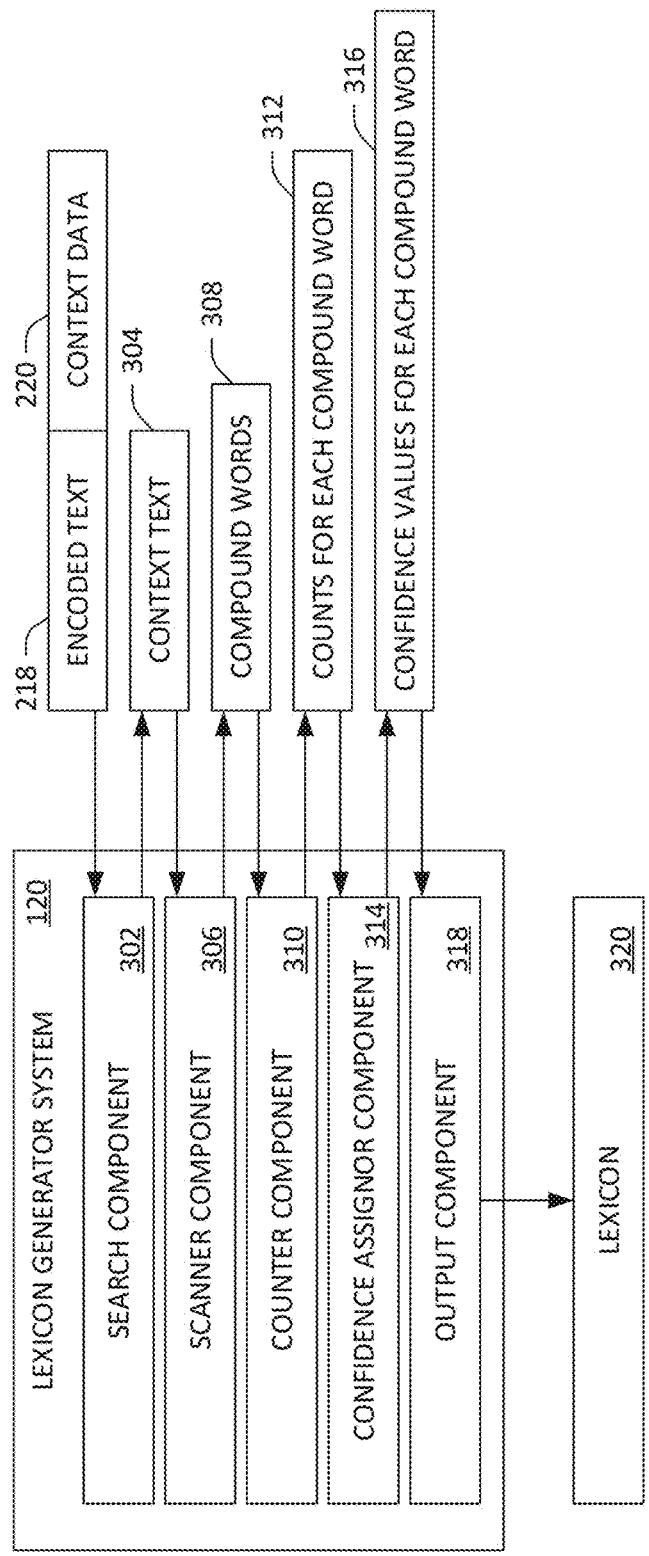
FIG. 3 is a functional block diagram of an exemplary system that is configured to generate a lexicon for a defined context.

Now referring to FIG. 3, a functional block diagram of the lexicon generator system 120 is illustrated. As can be ascertained, the lexicon generator system 120 can be included in a memory of a computing system and executed by a processor of the computing system. Accordingly, the computing system is programmed to be a special-purpose computing system that is configured to generate a lexicon for a particular context.

The lexicon generator system 120 includes a search component 302 that is configured to receive a query and execute the query over the encoded text 222 and associated context data 224 based upon the query. The query can include a reference to contextual information, such as location, demographic information, etc. Execution of the search over the encoded text 220 and associated context data 224 results in formation of context text 304 (e.g., any of the context texts 112-118 described with reference to FIG. 1). In other words, encoded text entries can be indexed by context, and the search component 302 can be configured to search over the encoded text 222 based upon the contextual indices.

The lexicon generator system 120 further comprises a scanner component 306 that is configured to scan the context text 304 and create compound words (which can include encoded words) from the context text 304. In an example, the scanner component 306 can be configured to perform multiple scans over each entry in the context text 304, wherein for each scan, a compound word resulting from the scan includes a different number of words. For example, in a first scan performed by the scanner component 306 over the context text 304, a compound word can include a single word. Accordingly, for the (un-encoded) entry "describe performance of scans", the scanner component 306 can generate four compound words: compound word 1: "describe"; compound word 2: "performance"; compound word 3: "of"; and compound word 4: "scans". The scanner component 306 can perform this scan for each entry. The scanner component 306 may then be configured to perform a second scan over the context text 304, wherein the compound words generated from the second scan each include two words in sequence.

Thus, with continued reference to the entry noted above, in the second scan, the scanner component 306 can generate three compound words: compound word 1: "describe performance"; compound word 2: "performance of"; and compound word 3: "of scans". Again, this second scan can be generated over each entry in the context text 304. The scanner component 306 can then output compound words generated during the scan. Continuing with the same example, the scanner component 306 can then be configured to perform a third scan over the entry, resulting in formation of two compound words: compound word 1: "describe performance of"; and compound word 2: "performance of scans". Therefore, for each scan performed by the scanner component 306, the scanner component 306 outputs compound words, where each compound word for a scan includes the same number of words, and wherein words in each compound word are in sequence (according to the sequence in the un-encoded text). After executing the scans, the scanner component 306 can output a plurality of compound words 308. While the above describes use of multiple scans, in an exemplary implementation, the scanner component 306 can be configured to form the compound words 308 in a single scan, and through use of multiple counters.

Figure 4:
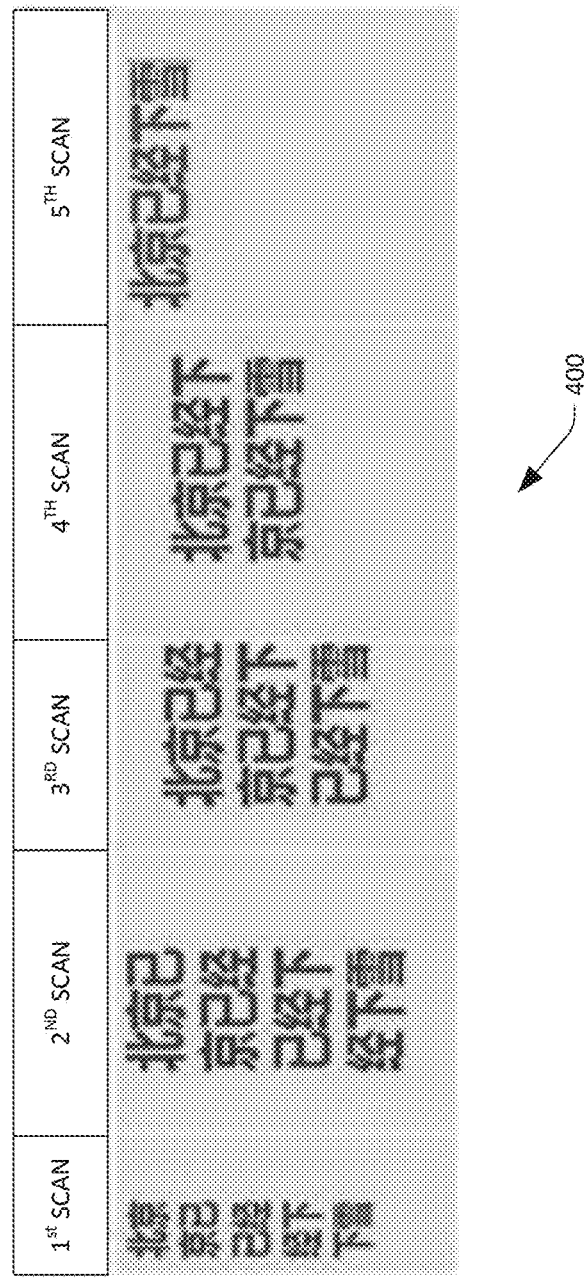
FIG. 4 is a table that illustrates exemplary scans that are conducted over at least a portion of text.

Turning briefly to FIG. 4, an exemplary table 400 illustrates scans that can be performed by the scanner component 306 over the Chinese phrase " ". As shown in table 400, the scanner component 306 can perform five separate scans, wherein the first scan results in five compound words, each compound word having one word (represented by two Chinese characters), the second scan results in compound words that include two words (represented by three Chinese characters), and so forth. In an exemplary embodiment, a number of scans performed by the scanner component 306 can be a function of the language of text represented by the context text 304. For languages that use alphanumeric characters to generate text, the scanner component 306 can be configured to create compound words that include one and two words. For languages that utilize logograms, the scanner component 306 can be configured to perform more scans (4, 5, or 6 scans). Again, it is to be emphasized that a single scan can be performed, where a maximum number of words in compound words may be different for different languages (e.g., two words for English, six words for Chinese).

Returning to FIG. 3, the lexicon generator system 120 also includes a counter component 310 that is configured to count a number of occurrences of each unique compound word in the compound words. As can be ascertained, the context text 304 may be a relatively large text corpus. Therefore, words and/or phrases that occur frequently in the context text 304 are likely to be included in the lexicon for the context identified in the query received by the search component 302. In operation, the counter component 310 can be provided with a sequence of compound words. The counter component 310 can ascertain whether a compound word has previously been observed in the sequence, and if so, increment a number of occurrences of such compound word. If the compound word has not previously been observed, the counter component 310 can generate an entry for the compound word, such that when the compound word subsequently appears in the sequence, the count for such compound word can be incremented. The counter component 310 can then output counts 312 for each compound word observed in the context text 304.

The lexicon generator system 120 can also include a confidence assignor component 314 that can assign confidence scores to each compound word based upon the counts for the compound word. For instance, the confidence assignor component 314 can consider relative frequency of occurrence of a compound word when determining the confidence score to assigned to such compound word. That is, the higher the frequency of the compound word relative to other compound words, the higher the confidence score that can be assigned to the compound word by the confidence assignor component 314.

In another example, the confidence assignor component 314 can consider recency when computing the confidence score. For instance, each entry represented in the context text 304 can have a timestamp assigned thereto. The confidence assignor component 314 can consider trends in use of compound words in the context text 304 when assigning the confidence scores, wherein increased frequency over time (or a "spike" in use of a compound word) can cause the confidence assignor component 314 to assign a higher score to the compound word. The confidence assignor component 314 can output confidence values 316 for the respective unique compound words.

The lexicon generator system 120 also includes an output component 318 that receives the compound words and confidence scores assigned thereto, decodes words in the compound words, and outputs a lexicon 320 for the context referenced in the query received by the search component 302. Contents of the lexicon are based upon the confidence scores assigned to the compound words by the confidence assignor component 314. In an example, the output component 318 can compare each confidence score assigned to a respective compound word with a threshold and can include (decoded) compound words in the lexicon that have a confidence score at or above the threshold, while refraining from including (decoded) compound words in the lexicon 320 that have confidence scores assigned thereto that are below the threshold. In another example, the output component 318 can include some threshold number of decoded compound words with highest confidence scores assigned thereto in the lexicon 320. In still yet another example, the output component 318 can cause some threshold percentage of decoded compound words with highest confidence scores assigned thereto to be included in the lexicon 320. The end result is a lexicon for a particular context.

It can be ascertained that the lexicon generator system 120 can update the lexicon relatively dynamically, as the lexicon generator system 120 can be provided with updated encoded text 222 and associated context data 224 on a relatively frequent basis. Further, the lexicon generator system 120 can be configured to relatively quickly alter the context (by modifying the query), such that a different set of encoded text and associated context data can be formed. Still further, the lexicon generator system 120 can be configured to generate lexicons for a variety of different contexts, including different languages.

FIGS. 5-8 illustrate exemplary methodologies relating to constructing a lexicon for a defined context. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 5:
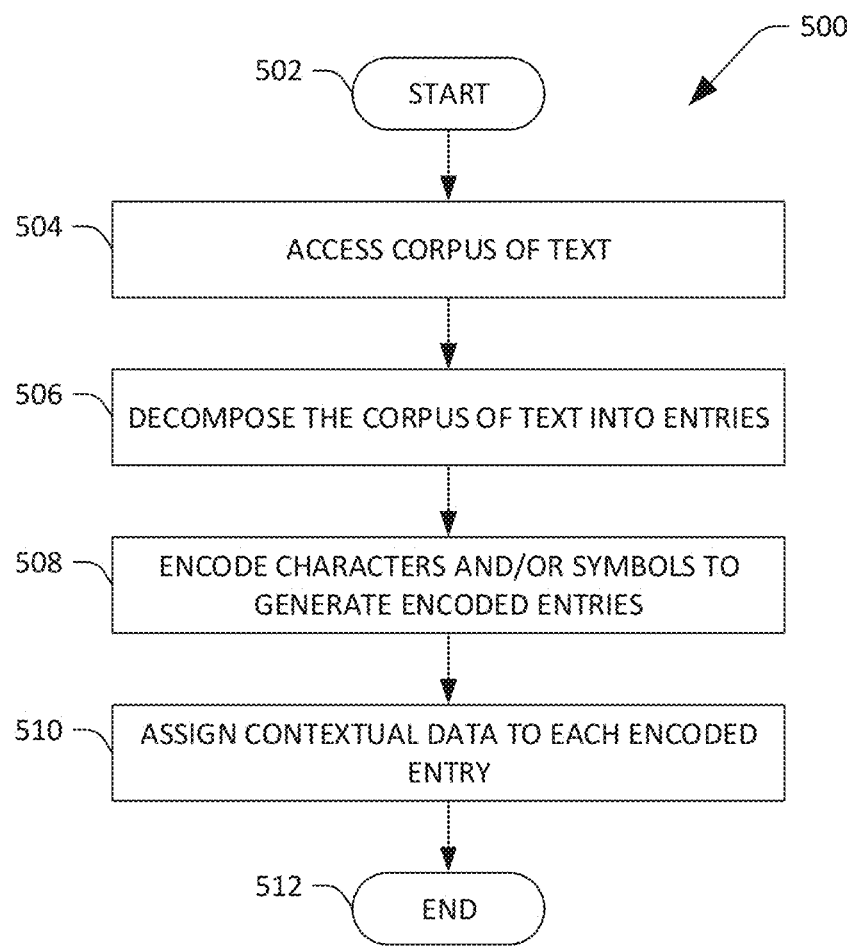
FIG. 5 is a flow diagram that illustrates an exemplary methodology for constructing a text corpus that has contextual data assigned to entries therein.

Now referring to FIG. 5, an exemplary methodology 500 for generating encoded text and associated context data is illustrated. The methodology 500, for example, can be executed by the computing system 202 referenced in FIG. 2. The methodology 500 starts at 502, and at 504, a corpus of text is access. As described above, this corpus of text may be text exposed by social networking application(s), where the text is generated and/or shared by users of the social networking application(s). At 506, the corpus of text is decomposed into a plurality of entries, where an entry can be a sentence or a phrase, for example.

At 508, the entries are encoded to generate encoded entries. For example, the entries can be encoded into Unicode. It is to be understood that the corpus of text can be decomposed before the text in the text corpus is encoded or after the text in the text corpus is encoded. Basic words in the entries can be determined as a function of the type of text in the entries; for example, basic words can be determined by separators, such as spaces, for words formed of alphanumeric characters (e.g., English, French, etc.). In another example, basic words can be characters for language such as Chinese, Japanese, and Korean. At 510, contextual data is assigned to each encoded entry. For example, as described above, profiles of users of social networking applications that generated the entries can be analyzed, and contextual data can be assigned to the entries based upon such analysis. This contextual data can include geographic information, social groups, demographic information, or the like. The methodology 500 completes at 512.

Figure 6:
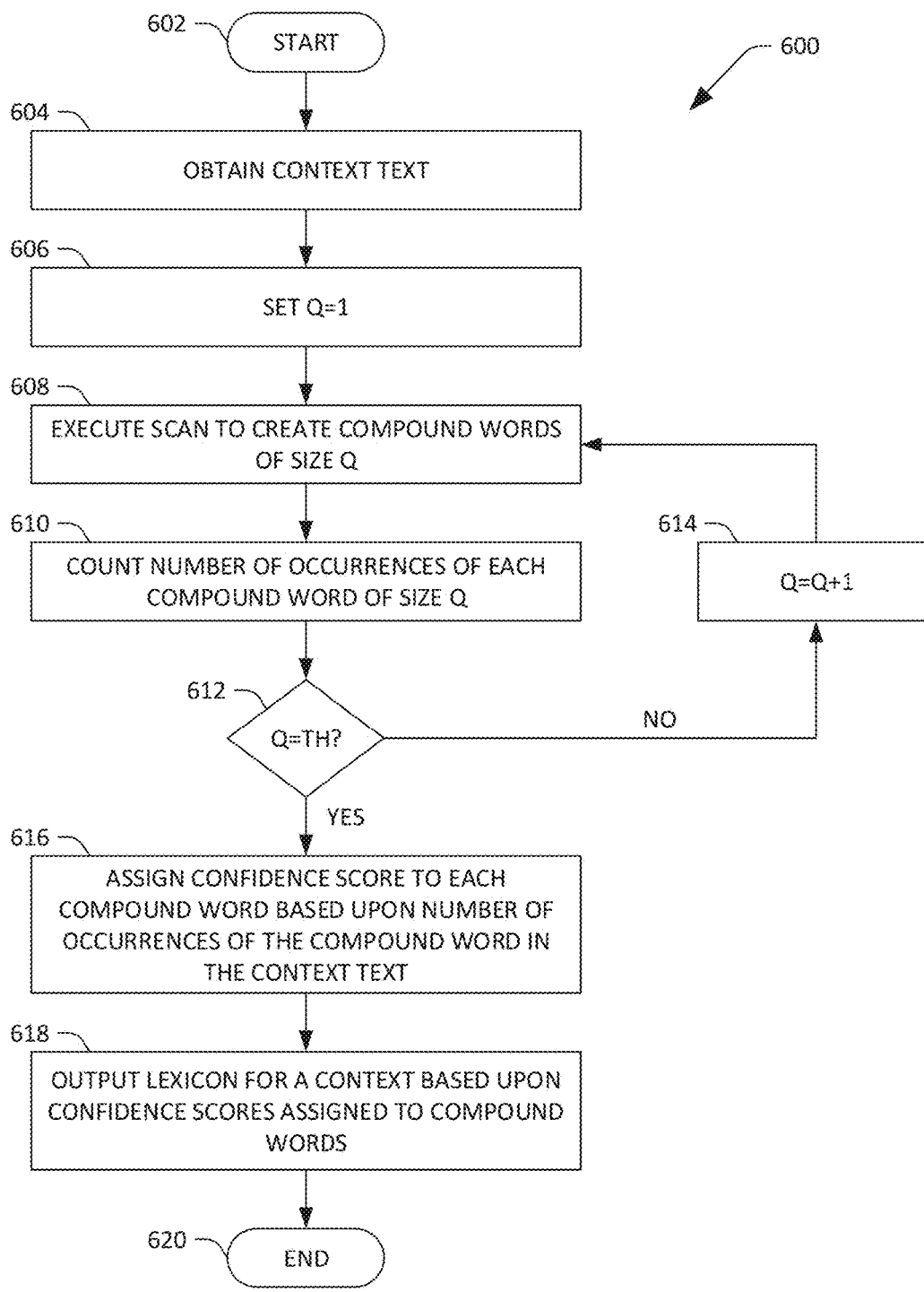
FIG. 6 is a flow diagram that illustrates an exemplary methodology for generating a lexicon for a defined context.

Referring now to FIG. 6, an exemplary methodology 600 that is configured to output a lexicon for a particular context is illustrated. The methodology 600 starts at 602, and at 604, context text is obtained. As described above, this context text can be obtained by executing a search over encoded data with contextual information assigned thereto, wherein a query used to perform the search indicates a context of interest (e.g., location, demographic information, etc.). At 606, a variable Q is set to 1, and at 608, a scan is executed over the context text to create compound words of size Q. Thus, when Q is set to 1, each compound word will include one word. At 610, a number of occurrences of each unique compound word of size Q is counted. At 612, a determination is made regarding whether Q is equal to a threshold. If Q has not reached the threshold, at 614, Q is incremented and the methodology 600 returns to 608, where another scan is performed, where the another scan results in formation of compound words of size Q. Acts 608, 610, 612, and 614 are repeated until Q has reached the threshold. This threshold, as indicated above, may be different for different contexts (languages). Instead of the loop referenced in FIG. 6, where multiple different scans are performed, the methodology 600 can be modified such that compound words of different sizes can be generated (and counted) in a single scan.

At 616, confidence scores are assigned to each compound word based upon a number of occurrences of the compound words counted at 610. At 618, a lexicon is output for the context text obtained at 604 based upon the confidence scores assigned to the compound words at 616. The methodology 600 can be re-executed for different contexts and languages. Further, contexts can be merged, and the methodology 600 can be executed over a merged context. In yet another example, a context can be split (e.g., into two or more granular contexts), and the methodology 600 can be executed over the more granular contexts to produce lexicons for the more granular contexts. The methodology 600 completes at 620.

Figure 7:
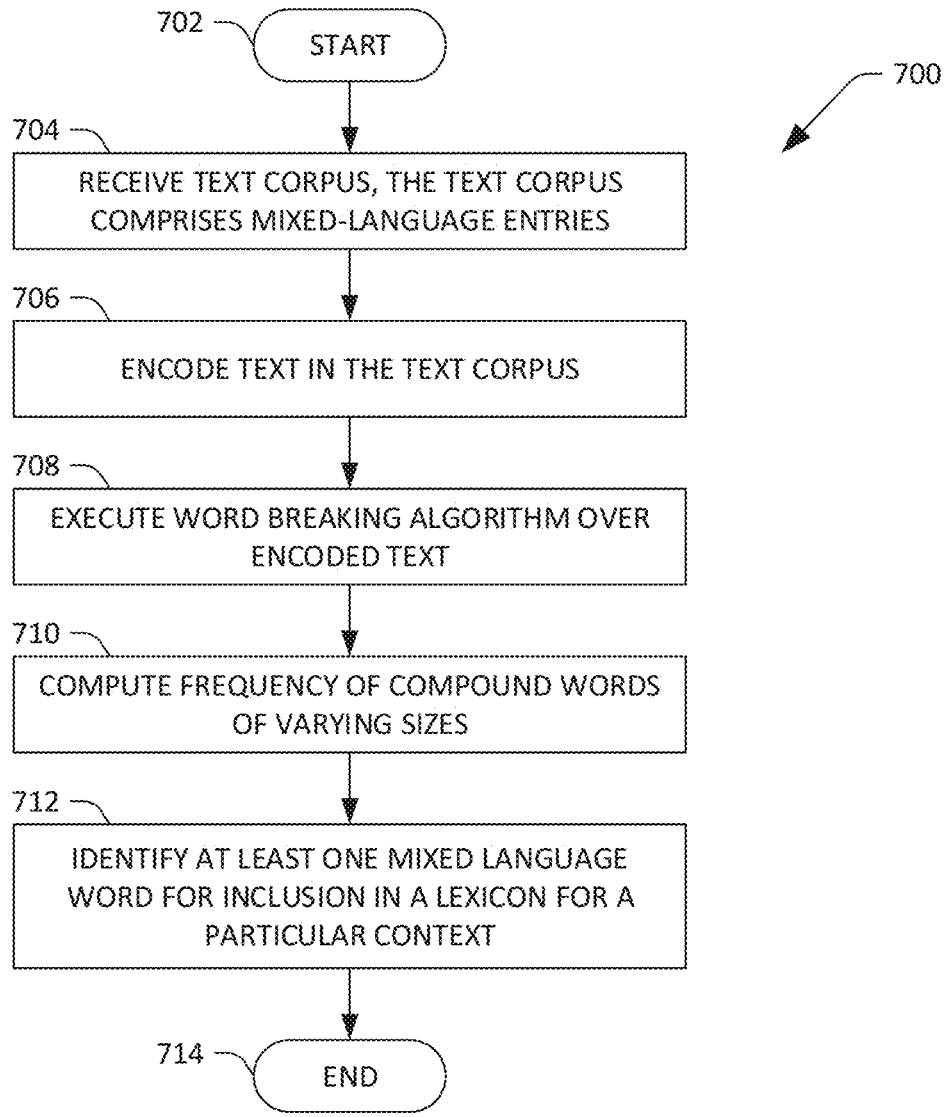
FIG. 7 is a flow diagram that illustrates an exemplary methodology for identifying at least one mixed language word or phrase that is being used in a defined context.

Now referring to FIG. 7, an exemplary methodology 700 that facilitates identifying at least one mixed language word or phrase for inclusion in a lexicon is illustrated. The methodology 700 starts at 702, and at 704, a text corpus is received, wherein the text corpus comprises mixed language entries. These mixed language entries can be mixed language words and/or mixed language phrases. At 706, text in the text corpus is encoded to generate encoded text (e.g., Unicode). At 708, a word breaking algorithm is executed over the encoded text to identify individual words represented in the encoded text. Optionally, the word breaking algorithm can be executed prior to the text being encoded at 706. At 710, frequency of occurrence of compound words in encoded text is computed. These frequencies can be computed, for example, using acts 608-614 of the methodology 600. At 712, at least one mixed language word or phrase is identified for inclusion in a lexicon for the text corpus received at 704. The methodology 700 completes at 714.

Figure 8:
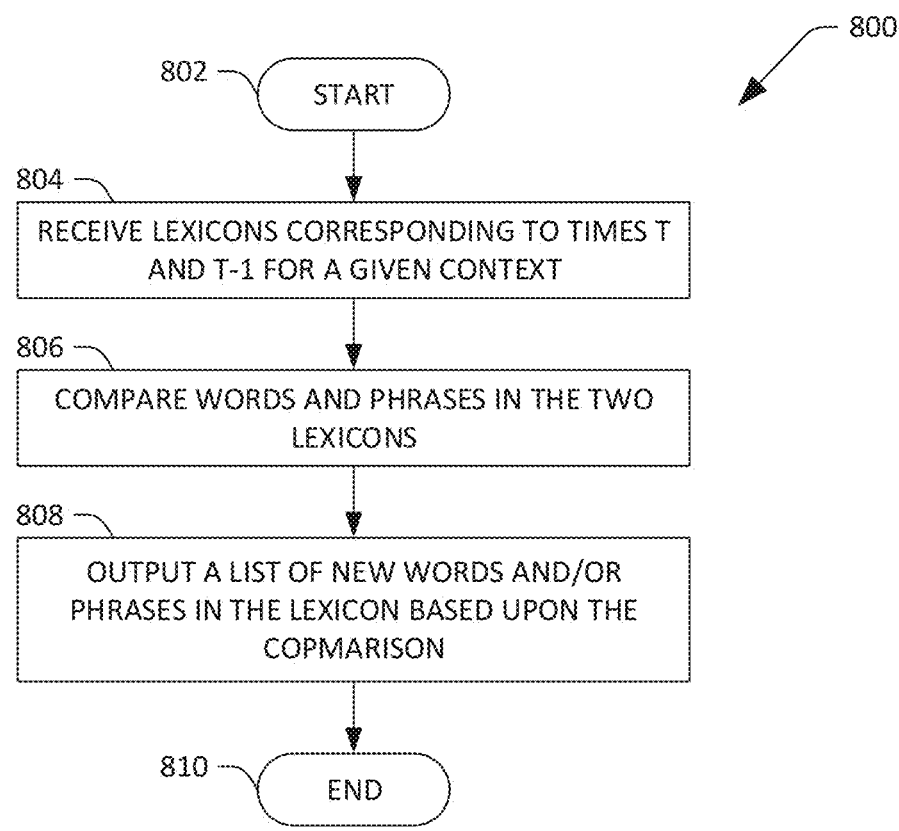
FIG. 8 is a flow diagram that illustrates an exemplary methodology for identifying new words and/or phrases that are being used by a particular population of users of a social networking application.

Now referring to FIG. 8, an exemplary methodology 800 that facilitates identifying words newly introduced into a lexicon is illustrated. The methodology 800 starts at 802, and at 804, a first lexicon for a defined context corresponding to time t (e.g., a current lexicon) is received, and a second lexicon for the defined context corresponding to time t−1 is received. At 806, words and phrases in the two lexicons are compared, and at 808, a list of new words and/or phrases in the lexicon are output based upon the comparison. For example, entries in the first lexicon that were not included in the second lexicon can be surfaced to identify words and/or phrases that have been newly introduced into the lexicon for the defined context. Similarly, words and/or phrases that have dropped from the lexicon can also be surfaced. This can be accomplished by comparing the two lexicons and surfacing words and/or phrases that exist in the second lexicon but do not exist in the first lexicon. The methodology 800 completes at 810.

Various examples are now set forth:

Example 1

A computing system comprising: a processor; and memory that comprises a lexicon generator system that is executed by the processor, the lexicon generator system configured to generate a lexicon used in context text, the lexicon generator system configured to include at least one of a mixed language word or a mixed language phrase in the lexicon based upon frequency of occurrence of the mixed language word or the mixed language phrase in the context text.

Example 2

A computing system according to Example 1, the mixed language word comprises a logogram in a first language and an alphanumeric character in a second language.

Example 3

A computing system according to Example 1, the mixed language phrase comprises a first word in a first language and a second word in a second language.

Example 4

A computing system according to any of Examples 1-3, the defined context being based upon at least one of: a gender of generators or sharers of text in the context text; a geographic location of the generators of sharers of the text in the context text; an age range of the generators or sharers of text in the context text; explicitly defined interests of the creators of text in the context text; or a combination of two or more of the gender, the geographic location, the age range, or the interests.

Example 5

A computing system according to any of Examples 1-4, the memory further comprises a text corpus generator system that is configured to generate a text corpus, the text corpus generator system comprises: an encoder component that is configured to encode social media text into encoded text, the social media text exposed by a social networking application, the encoded text normalizes text across multiple languages, the context text comprises at least a portion of the encoded text.

Example 6

A computing system according to Example 5, the encoder component configured to encode the text in the text corpus into Unicode.

Example 7

A computing system according to any of Examples 5-6, the text corpus generator system further comprises: a context extractor component that is configured to extract contextual data from profiles of users of the social networking application, the context extractor component further configured to assign contextual data to entries in the social media text based upon the contextual data extracted by the context extractor component.

Example 8

A computing system according to any of Examples 1-7, the lexicon generator system comprises: a scanner component that is configured to execute a scan over encoded entries in the context text to form compound words, and wherein the lexicon generator system is configured to generate the lexicon based upon the compound words.

Example 9

A computing system according to Example 8, the scanner component configured to execute multiple scans over the encoded entries, wherein each scan has a predefined value assigned thereto that defines a number of words that are to be included in each compound word of each scan.

Example 10

A computing system accordingly to any of Examples 8-9, the lexicon generator system further comprises a counter component that is configured to count, for each unique compound word in the compound words, a number of occurrences of a unique compound word, wherein the lexicon generator system is configured to generate the lexicon based upon the number of occurrences of each compound word in the plurality of compound words.

Example 11

A computing system according to Example 10, the lexicon generator system further comprises a confidence assignor component that assigns, for each unique compound word in the compound words, a respective confidence score, the confidence score based upon the number of occurrences of the unique compound word in the compound words, and wherein the lexicon generator system is configured to generate the lexicon based upon confidence scores assigned by the confidence assignor component to respective compound words.

Example 12

A computing system according to Example 11, the lexicon generator system further comprises an output component that is configured to select compound words to include in the lexicon, and is further configured to decode the compound words that are to be included in the lexicon.

Example 13

A method executed by a computing system that is configured to generate a lexicon for a predefined context, the method comprising: accessing context text that corresponds to the predefined context, the context text acquired from at least one computer-implemented social networking application, the context text comprises at least one mixed language word or mixed language phrase; identifying entries in the context text, the entries representative of phrases or sentences in the context text; executing a scan over the entries in the context text to form compound words, a compound word representative of one of the mixed language word or the mixed language phrase; computing a frequency of occurrence of the compound word; and generating the lexicon based upon the frequency of occurrence of the compound word, the lexicon comprises the mixed language word or the mixed language phrase represented by the compound word.

Example 14

A method according to Example 13, the mixed language word comprising a logogram and an alphanumerical character.

Example 15

A method according to Example 14, the logogram being a Chinese symbol.

Example 16

A method according to Example 13, the mixed language phrase comprising a first word in a first language and a second word in a second language, the first word comprises at least one alphanumeric character, the second word comprises at least one logogram.

Example 17

A method according to any of Examples 13-16, further comprising: determining a recency of occurrence of the compound word; and generating the lexicon based upon the recency of occurrence of the compound word.

Example 18

A method according to any of Examples 13-17, further comprising: forming the context text, wherein forming the context text comprises: executing a search over a context repository based upon a received query, the context repository comprises encoded text that is indexed by contextual data, the query pertaining to the predefined context; and including results of the search in the context text.

Example 19

A method according to Example 18, wherein forming the context text further comprises: acquiring social media text, the social media text comprises posts generated or shared by users of a social networking application; encoding the social media text to generate the encoded text, the encoded text being Unicode; and assigning the contextual data to the encoded text based upon information in profiles of the users of the social networking application.

Example 20

A computer-readable storage medium comprising instructions that, when executed by a processor, cause the processor to perform acts comprising: accessing context text that is identified as corresponding to a particular geographic region, the context text based upon posts set forth in a social networking application; and constructing a lexicon for the particular geographic region based upon frequency of occurrence of words and phrases represented in the context text, wherein constructing the lexicon comprises identifying at least one mixed language word or mixed language phrase represented in the context text to include in the lexicon based upon a frequency of occurrence of the at least one mixed language word or mixed language phrase in the context text.

Example 21

A computing device comprising: means for accessing context text that corresponds to the predefined context, the context text acquired from at least one computer-implemented social networking application, the context text comprises at least one mixed language word or mixed language phrase; means for identifying entries in the context text, the entries representative of phrases or sentences in the context text; means for executing a scan over the entries in the context text to form compound words, a compound word representative of one of the mixed language word or the mixed language phrase; means for computing a frequency of occurrence of the compound word; and means for generating the lexicon based upon the frequency of occurrence of the compound word, the lexicon comprises the mixed language word or the mixed language phrase represented by the compound word.

Figure 9:
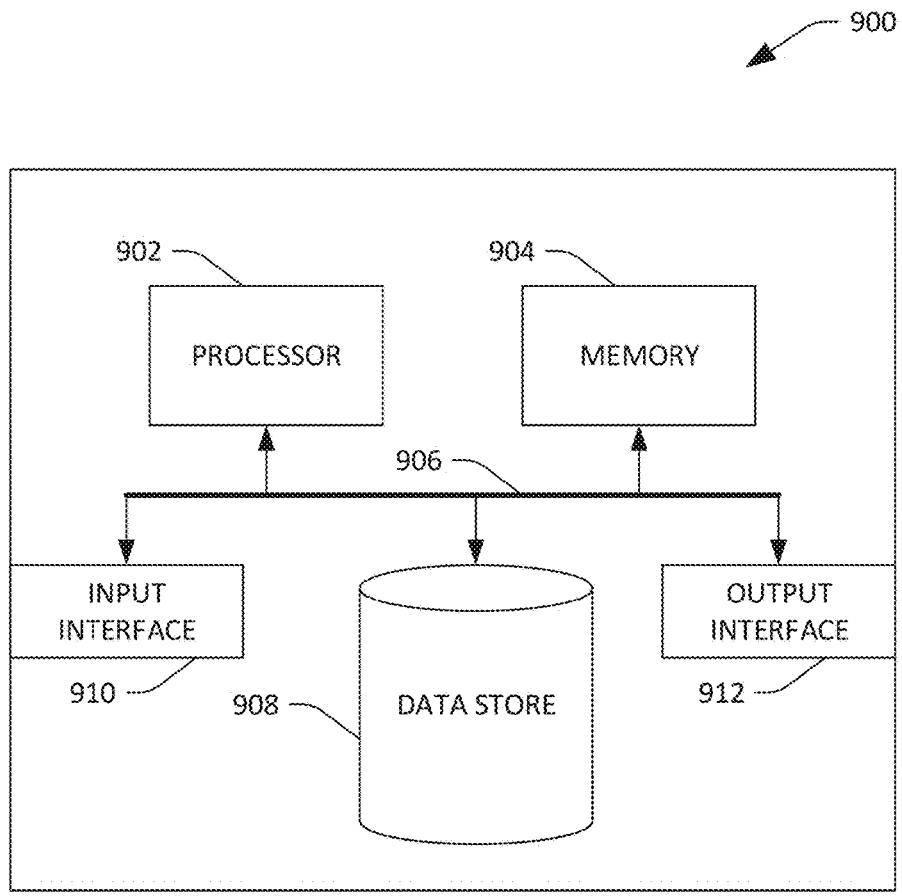
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that supports construction of encoded text entries with context data assigned thereto. By way of another example, the computing device 900 can be used in a system that is configured to construct a lexicon for a defined context. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store context text, encoded text entries, etc.

The computing device 900 additionally includes a data store 908 that is accessible by the processor 902 by way of the system bus 906. The data store 908 may include executable instructions, text entries, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system that generates a lexicon of a social network, the computing system comprising:
    a processor; and
    memory storing instructions that, when executed by the processor, provide:
        a lexicon generator that:
            for respective messages of the social network:
                identifies a context of the message,
                scans the message to identify a set of word sequences, and
                counts an occurrence of the respective word sequences among the messages within the context;
            for respective contexts, generates a lexicon for the context that comprises the word sequences identified in the messages with a higher count than a word sequence count threshold;
            identifies a selected word sequence by which at least one user of the social network who is associated with the selected word sequence is identifiable; and
            refrains from including the selected word sequence from the lexicon; and
        a lexicon presenter that, responsive to a selection by a user of a selected context, presents to the user the lexicon of word sequences for the selected context.

2. The computing system of claim 1, wherein a word sequence of selected message further comprises a first word in a first language and a second word in a second language.

3. The computing system of claim 1, wherein the contexts of respective messages are based upon at least one of:
    a gender of generators or sharers of the message;
    a geographic location of the generators or sharers of the message;
    an age range of the generators or sharers of the message; and
    explicitly defined interests of the generators or sharers of the message.

4. The computing system of claim 1, wherein the lexicon generator scans the respective messages to identify the word sequences by:
    incrementally selecting a sequence length; and
    partitioning the message into word sequences of the sequence length that are to be counted for occurrence among the messages by the scan.

5. The computing system of claim 1, wherein the lexicon generator further comprises a confidence assignor, for each word sequence identified in the messages of a selected context, a confidence score based upon the count of occurrences of the word sequence among the messages of the context; and wherein the lexicon generator further generates the lexicon based upon the confidence scores assigned by the confidence assignor component to respective word sequences of the context.

6. The computer system of claim 5, wherein the confidence assignor assigns the confidence scores for the respective messages by:

for respective word sequences, identifying the count of the occurrences of the word sequence among the messages of the respective contexts over time; and assigning the confidence scores to the respective word sequences according to the count over time of the occurrences of the respective word sequences among the messages of the respective contexts.

7. The computer system of claim 6, wherein the lexicon generator generates the lexicon for the context by choosing the word sequences having confidence scores above a confidence score threshold.

8. The computer system of claim 6, wherein identifying the count of the occurrences of the word sequence over time further comprises: identifying, over time, a spike in the count of the occurrences of the word sequence that indicates a trend in the occurrences of the word sequence over time.

9. The computer system of claim 6, wherein the lexicon generator generates the lexicon for the context by:

ordering the respective word sequences within the context according to the respective confidence scores; and choosing a top percentage of the word sequences having highest confidence scores among the messages of the context.

10. The computer system of claim 1, wherein the lexicon generator further removes uniquely identifying information from the respective messages that identifies the generators or sharers of the messages.

11. The computer system of claim 10, wherein:

the lexicon generator uses the uniquely identifying information to identify the context of the message; and the lexicon generator excludes word sequences that include the uniquely identifying information.

12. The computer system of claim 11, wherein:

the social network interface retrieves social network user profiles of the respective generators or sharers of the respective messages; and the lexicon generator retrieves the uniquely identifying information from the social network user profiles of the respective generators or sharers of the messages.

13. The computer system of claim 1, wherein the lexicon presenter the lexicon of word sequence to the user by:

receiving, from the user, a context query that specifies context properties;

among the contexts, identifying a selected context that matches the context properties of the query; and presents the lexicon of word sequences of messages for the selected context.

14. The method of claim 1, wherein identifying the selected word sequence in the lexicon by which at least one user of the social network who is associated with the selected word sequence is identifiable further comprises: determining that the selected word sequence uniquely identifies at least one user.

15. The method of claim 1, wherein identifying the selected word sequence in the lexicon by which at least one user of the social network who is associated with the selected word sequence is identifiable further comprises: determining that the selected word sequence is associated with private information of at least one user.

16. The method of claim 1, wherein identifying the selected word sequence in the lexicon by which at least one user of the social network who is associated with the selected word sequence is identifiable further comprises: determining that the selected word sequence identifies a social relationship between a first user of the social network and a second user of the social network.

17. A method of generating a lexicon for a context of a social network, the method involving a device and comprising:

executing, by the processor, instructions that cause the device to:

among messages of the social network, identify selected messages that are within the context;

scan the respective selected message to identify a set of word sequences;

count an occurrence of the respective word sequences among the selected messages within the context;

generate a lexicon for the context that comprises the word sequences identified in the selected messages with a higher count than a word sequence count threshold;

identify a selected word sequence by which at least one user of the social network who is associated with the selected word sequence is identifiable; and refrain from including the selected word sequence in the lexicon; and responsive to a request by the user to present word sequences that frequently occur in the context, present to the user the lexicon of word sequences for the context.

18. The method of claim 17, wherein:

scanning the respective selected message to identify a set of word sequences further comprises: determining a recency of the message; and generating the lexicon further comprises: generate a lexicon for the context that comprises the word sequences identified in the selected messages with a higher count than a word sequence count threshold and that have a recency greater than a recency threshold.

19. The method of claim 18, wherein generating the lexicon further comprises:

generate a lexicon for the context that comprises new word sequences that are identified in the selected messages with a higher count than a word sequence count threshold, and that do not appear in messages having a recency before a recency threshold.

20. A method of generating a lexicon from users of a social network who are respectively identified by a user profile, the method comprising:

for respective users of the social network, performing an evaluation of the user profile of the user to identify a context of the user and respective messages associated with the user, while refraining from using information that distinctively identifies the selected user;

among the messages of the social network, identifying selected messages that are within the context according to the context of at least one user who is associated with the message;

scanning the respective selected message to identify a set of word sequences;

counting an occurrence of the respective word sequences among the selected messages within the context;

generating a lexicon for the context that comprises the word sequences identified in the selected messages with a higher count than a word sequence count threshold; and responsive to a request by the user to present word sequences that frequently occur in the context, presenting to the user the lexicon of word sequences for the context.

\* \* \* \* \*